United States Patent [19]

Stoltz

[11] 4,142,644

[45] Mar. 6, 1979

[54] TELESCOPING VEHICLES

[76] Inventor: Woodrow W. Stoltz, P.O. Box 35103, Tulsa, Okla. 74135

[21] Appl. No.: 820,581

[22] Filed: Aug. 1, 1977

[51] Int. Cl.² ............................................. B65H 51/00
[52] U.S. Cl. .................................... 414/431; 414/745; 414/910
[58] Field of Search ........ 105/367; 214/1 P, 338–340, 214/DIG. 3; 118/318, 320, 321, 500, 503

[56] References Cited

U.S. PATENT DOCUMENTS

| 2,500,204 | 3/1950 | Ronay | 214/340 X |
| 3,435,969 | 4/1969 | McCartney et al. | 214/84 |
| 3,581,922 | 6/1971 | Versoy | 214/338 |

*Primary Examiner*—Robert G. Sheridan
*Attorney, Agent, or Firm*—Head, Johnson & Chafin

[57] ABSTRACT

Telescoping vehicles particularly designed and constructed for supporting the opposite ends of elongated members whereby one elongated member is suspended between a pair of the vehicles and a succeeding elongated member is suspended between a succeeding pair of vehicles, the vehicles being so arranged that the rear vehicle of the leading elongated member will nest or telescope within the leading vehicle of the following elongated member in such a manner that the adjacent ends of in-line elongated members will be in abutment.

11 Claims, 7 Drawing Figures

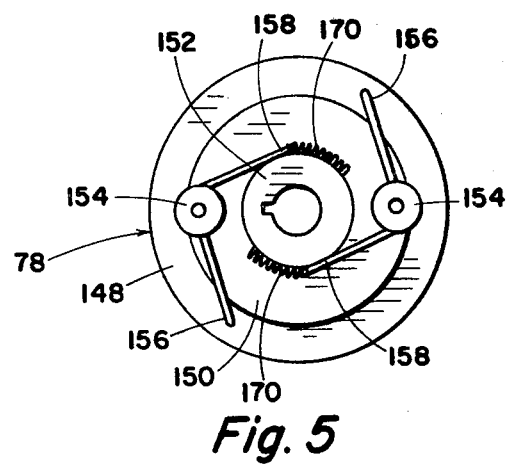
Fig. 5
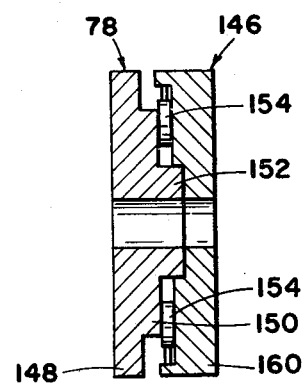
Fig. 7
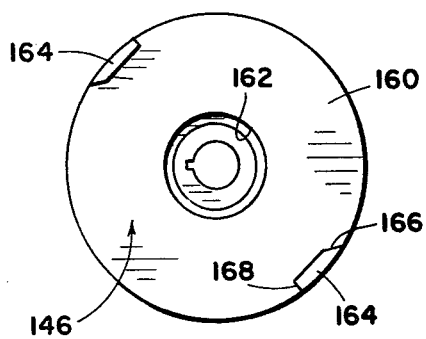
Fig. 6
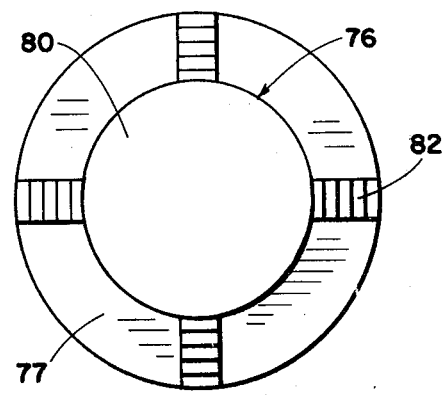
Fig. 4
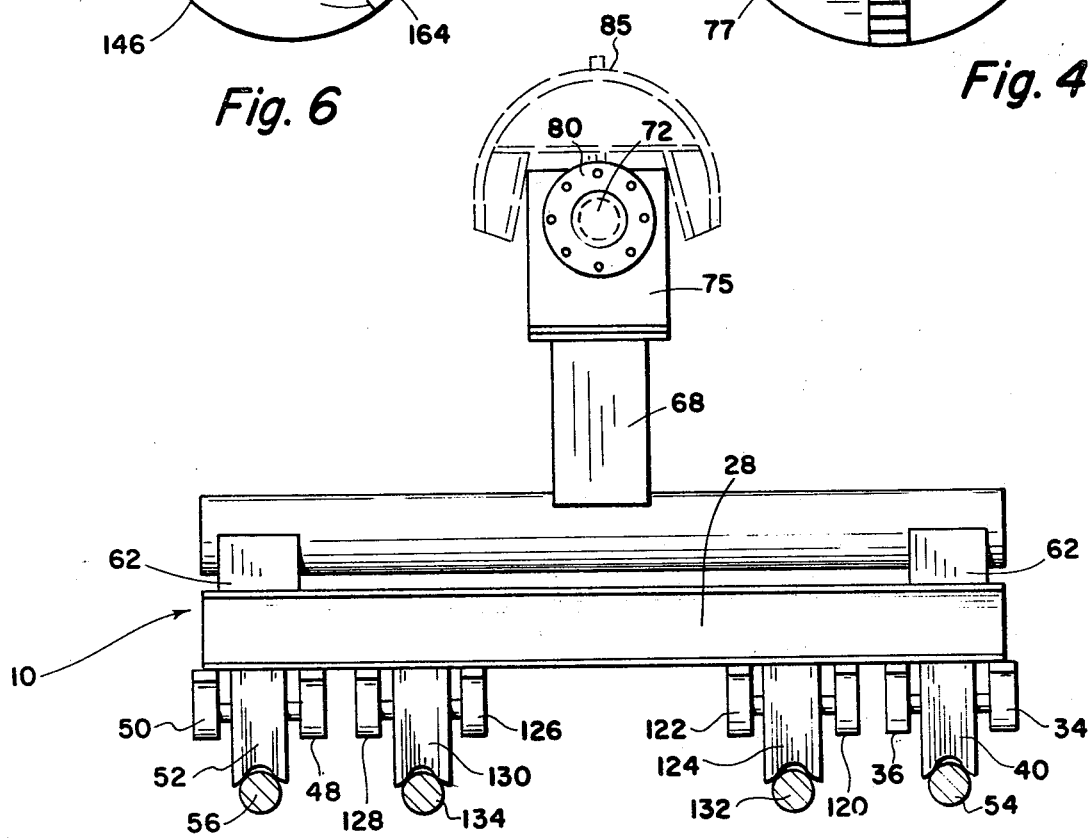

TELESCOPING VEHICLES

CROSS-REFERENCE TO RELATED APPLICATION

This application is related to my co-pending application Ser. No. 815,910, filed July 15, 1977, entitled "Pipe Coating System."

BACKGROUND OF THE INVENTION

1. Field of the Invention

This invention relates to improvements in vehicles and more particularly, but not by way of limitation, to complementary pairs of vehicles adapted for mutually telescopic disposition during the transporting of in-line objects.

2. Description of the Prior Art

The service life of steel pipes, and the like, is greatly increased by the application of an external coating material thereto. Steel pipe sections are normally relatively long and heavy and somewhat difficult to handle during a coating operation. In order to overcome the present-day difficulties of these pipe coating operations, the system as set forth in my aforementioned application has been developed wherein a plurality of individual pipe sections are moved sequentially through the steps required for the efficient coating operation. During many of the coating steps, the heavy pipe sections are supported by rolling or wheeled vehicles which carry the pipe sections through the coating stations in such a manner that the entire outer periphery of each pipe section is thoroughly and efficiently coated.

In order to achieve the optimum coverage during the coating operation, the system set forth in my co-pending application, including the combined longitudinal and rotation movement of each pipe section carried by the wheeled vehicles, is used. The pipe sections are moved in a forward longitudinal direction by suitable push roller means and rotated about the longitudinal axes thereof by suitable plug means carried by the wheeled vehicles. In order to provide a more efficient movement of the individual pipe sections carried by the wheeled vehicles, it is important that the pipe sections be maintained in a substantially abutting end-to-end relation, which is difficult to achieve with presently available rolling or wheeled vehicles of this type.

SUMMARY OF THE INVENTION

The present invention contemplates complementary pairs of wheeled vehicles for supporting individual pipe sections in a suspended manner therebetween. Each vehicle is provided with an upstanding pipe-engaging plug means for insertion within the open end of the pipe section whereby the pipe section is suspended therebetween with contact of the inner periphery thereof only, thus precluding any interference with the subsequent coating operations. The plug means is suitably journalled on the respective vehicle for free rotation in order that each pipe section may be rotated about its own longitudinal axis while moving longitudinally as the vehicle is moved in the direction of the length of the pipe.

Each vehicle is provided with at least two pair of axially aligned spaced wheels with one pair of said wheels being the front wheels and the other pair of said wheels being the rear wheels. The distance between the axially aligned front wheels is different from the distance between the axially aligned rear wheels whereby the rear wheels of a leading vehicle may move in a passing relation with the front wheels of the next succeeding following vehicle in order that the adjacent pipe ends of the two pipe sequential sections may be moved into a substantially end-to-end abutting relationship without interference between the two supporting vehicles.

In addition, it is important that all of the pipe sections continually rotate about the longitudinal axes thereof. In order to facilitate this rotational movement, each plug means is preferably provided with a clutch or ratchet means automatically engagable with the clutch or ratchet means of the adjacent plug means whereby the nesting or telescopic arrangement between the two adjacent vehicles will interconnect the plug means thereof and any rotation of one of the individual pipe sections will be transmitted throughout all of the pipe sections in the connected sequence.

As hereinbefore set forth, and as set forth in my aforementioned co-pending application, the individual pipe sections are engaged by suitable push rollers for imparting a longitudinal movement to the particular pipe section disposed in engagement therewith. The longitudinal movement is imparted from the engaged pipe to all of the preceding pipe sections by virtue of the end-to-end positioning and clutching engagement of the respective plug clutch means as hereinbefore set forth. In addition, the engagement of the push roller means with the pipe section imparts a simultaneous rotational movement to the particular pipe section engaged thereby. This rotational movement is transmitted to the plug means of the rotating pipe section, and the engaged clutch means between two adjacent plug means transmits the rotation to the next preceding pipe section, and so forth, thus providing for a continuous combined rotational and longitudinal movement for the pipe sections being transported by the vehicles.

Of course, when a pipe section suspended between a pair of the novel vehicles has been completely coated, the pipe section may be released from engagement with the plug means, and the empty vehicles may be moved in a reverse direction for repeating the operation with another pipe section, as set forth in my aforementioned co-pending application.

BRIEF DESCRIPTION OF THE DRAWINGS

FIG. 3 is a front elevational view of a wheeled vehicle embodying the invention.

FIG. 4 is a view taken on line 4—4 of FIG. 1.

FIG. 5 is a view taken on line 5—5 of FIG. 1.

FIG. 6 is a view taken on line 6—6 of FIG. 1.

FIG. 7 is a sectional view of mating clutch elements such as used in the invention.

DETAILED DESCRIPTION OF THE PREFERRED EMBODIMENT

Figure 1:
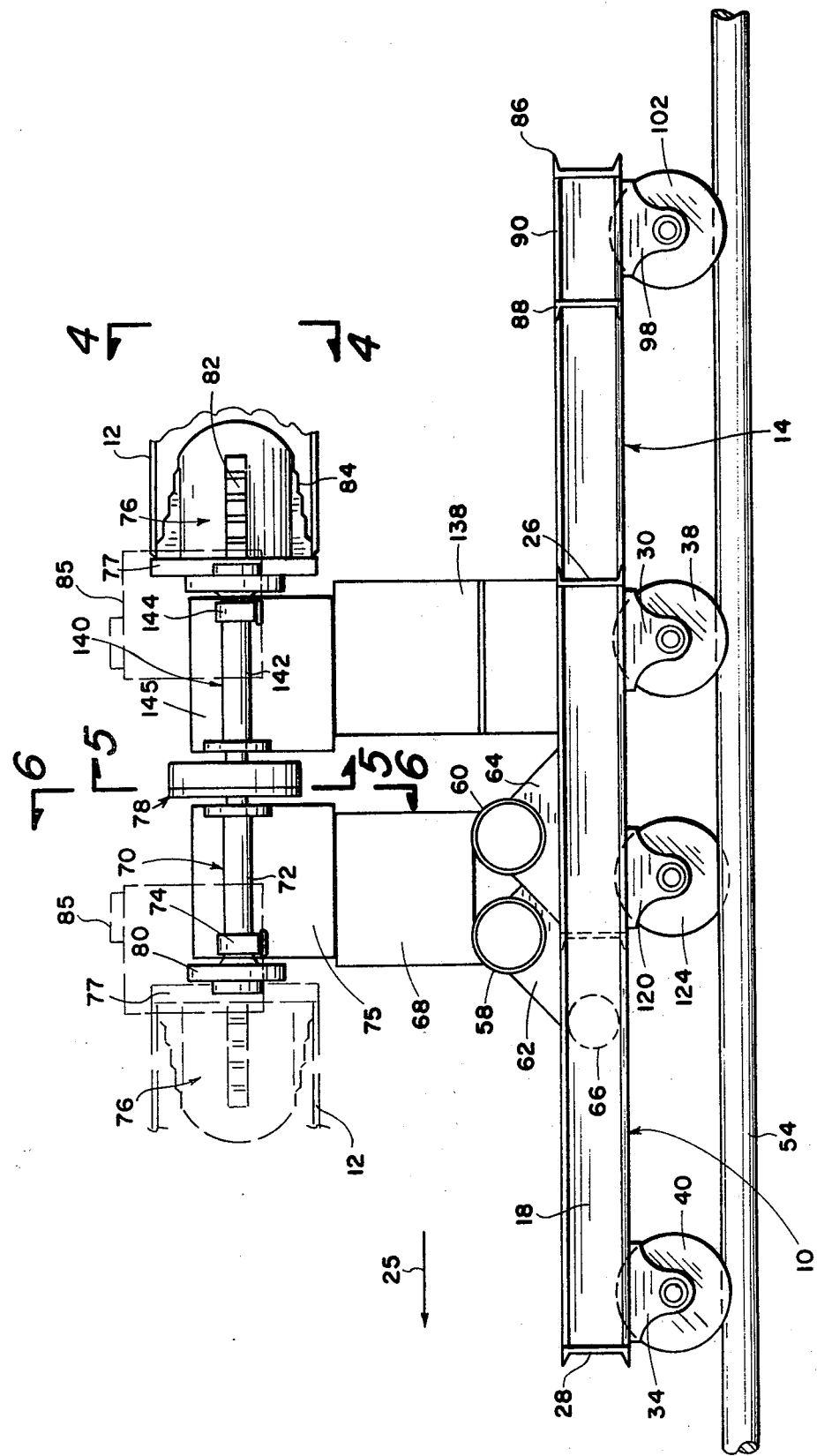
FIG. 1 is a side elevational view of a pair of wheeled vehicles embodying the invention and disposed in a nested or mutually telescopic position.

Referring to the drawings in detail, reference character 10 generally indicates a vehicle for supporting one end of a pipe section 12, and reference numeral 14 generally indicates a vehicle for supporting the opposite end of the pipe section 12, as will be hereinafter set forth. The vehicle 10 comprises a basic framework structure 16 which includes a first pair of mutually parallel spaced channel members 18 and 20 spaced from a substantially identical second pair of mutually parallel spaced channel members 22 and 24, as particularly shown in FIG. 2. Assuming the vehicles 10 and 14 move in a direction as indicated by the arrow 25, the rear or right-hand end of the channel members 18 and 20, as viewed in FIG. 2, may be rigidly secured in said spaced relation by a suitable cross member 26, and the rear of right-hand ends of the channels 22 and 24 may be similarly rigidly secured in said spaced relation by a cross member 27. The front or left-hand ends of the channels 18 and 20 and channels 22 and 24 may be secured in said spaced relation by a common cross member 28 which preferably extends transversely across the entire width of the vehicle 10, from the outboard channel 18 to the outboard channel 24. Thus, a substantially rectangular configuration is provided for the framework structure 26.

A first pair of substantially aligned, downwardly depending bracket members 30 and 32 are welded or otherwise secured to the channels 18 and 20 in the proximity of the cross member 26, and a second pair of substantially identical aligned brackets 34 and 36 are similarly rigidly secured to the channels 18 and 20 in the proximity of the cross member 28. A first wheel 38, which may be considered as a rear wheel, is suitably journalled between the brackets 30 and 32, and a second wheel 40, which may be considered as a front wheel, is suitably journalled between the brackets 34 and 36, with the wheels 38 and 40 being disposed in substantial "tracking" relationship for a purpose as will be hereinafter set forth.

A pair of downwardly depending oppositely disposed brackets 42 and 44 are welded or otherwise rigidly secured to the channels 22 and 24 in substantial alignment with the brackets 30 and 32, and a rear wheel 46 corresponding to the wheel 38 and in substantial axial alignment therewith is suitably journalled between the brackets 42 and 44. A pair of similar brackets 48 and 50 are secured to the channels 22 and 24 in substantial alignment with the brackets 34 and 36, and a front wheel 52 corresponding to the wheel 40 is suitably journalled therebetween. The wheel 52 is in substantial axial alignment with the wheel 40 and is in substantial "tracking " relationship with the wheel 46. In addition, it is preferable that one pair of "tracking" wheels, such as the wheels 38 and 40, be of a fixed axial position, but freely rotatable thereabout, whereas the other "tracking" wheels, such as the wheels 46 and 52, be floating wheels, or mounted in such a manner as to be axially movable, for a purpose as will be hereinafter set forth.

Figure 2:
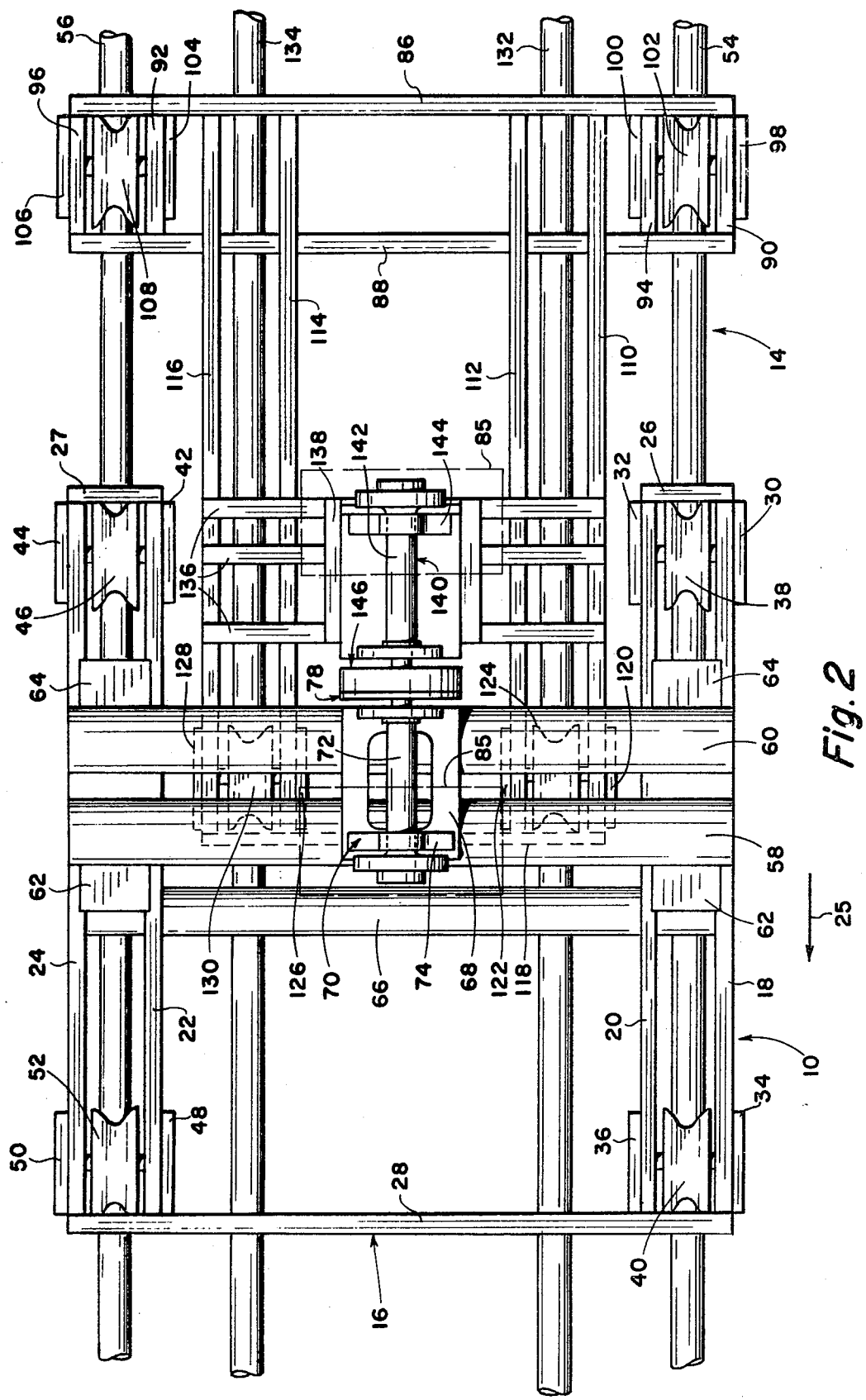
FIG. 2 is a plan view of a pair of wheeled vehicles embodying the invention and disposed in a nested or mutually telescopic position.

The wheels 38, 40, 46 and 52 may be of any suitable type, but as shown herein, it is preferable that the wheels be of the type having a grooved outer periphery for engagement with suitable rails 54 and 56, as particularly shown in FIG. 2, for moving therealong in the manner as set forth in my aforementioned co-pending application.

A pair of spaced tubular members 58 and 60 extend transversely across the upper portion of the frame 16 and are preferably supported in the proximity of each end by suitable block members 62 and 64, respectively, which are in turn secured to the channels 18, 20, 22, and 24 in any well-known manner (not shown). It is also preferable to provide a strengthening member 66 secured between the channel members 18, 20, 22, and 24 and spaced slightly from the tubular member 58 as will be seen in FIGS. 1 and 2. A pedestal 68 is secured to the tubular support members 58 and 60 in any well-known manner for supporting a plug means generally indicated at 70.

The plug means 70 is provided for supporting one end of the pipe section 12 and as shown herein comprises a substantially horizontally extending rotatable axle 72 journalled in a pillow block bearing 74, or the like, secured to a support block 75. The block 75 is slidably secured to the pedestal 68. A pipe engaging plug 76 is secured to one end of the axle 72 for rotation simultaneously therewith, and a clutch element 78 is secured to the opposite end of the axle 72 for rotation therewith, as will be hereinafter set forth in detail.

The pipe engaging plug means 76 is adapted for insertion within the open end of the pipe section 12, as shown in FIG. 1, and engages only the inner periphery of the pipe, thus precluding interference with the coating of the exterior of the pipe, and eliminating contact with the coating material subsequent to the application thereof to the pipe and prior to the complete curing of the coating material. In order to accomplish this, the plug means 76 as shown herein comprises a plate or disc member 77 bolted or otherwise secured to a complementary flange member 80 which is secured to one end of the axle 72 for rotation simultaneously therewith. A central core member 80 extends axially outwardly drom the plate 78 and is provided with a plurality of circumferentially spaced radially extending pipe engaging elements or shoes 82. The outer or exposed edge of each shoe 82 is serrated or stair-stepped, as particularly shown at 82 in FIG. 1 in order that the pipe engaging means 76 may be utilized with a variety of diametric sizes of pipe sections 12. In addition, it may be preferable that each step of the edge 84 be of a tapered configuration whereby the shoes 82 may be securely wedged against the inner periphery of the pipe section 12 when the pipe section 12 is being supported by the vehicles 10 and 14 as will be hereinafter set forth.

It is desirable to provide a protector 85 (shown in broken lines in FIGS. 1, 2 and 3) for each pipe plug apparatus 76 and which covers the exposed portions of the plug 76 as well as the end of the pipe section 12 supported thereon. This precludes accidental coating of the plug 76 and the end of the pipe during the coating operation. The protector 85 may be of any suitable configuration, and as shown herein is substantially arcuated in cross section, and is supported by the block 75 in any suitable manner for encasing the end of the pipe and the plate 77 without engagement thereof.

The vehicle 14 cooperates with the vehicle 10 for supporting a pipe section 12 therebetween, an for transmitting a combined rotational and longitudinal movement between a plurality of successively disposed pipe sections moving through a pipe coating system as set forth in my aforementioned co-pending application Ser. No. 815,910, filed June 15, 1977. The vehicle 14 comprises a pair of spaced mutually parallel transversely extending channel members 86 and 88 (FIG. 2) having the opposite ends thereof spaced apart by suitable cross members 90 and 92. A pair of inboard cross members 94 and 96 are spaced from the cross members 90 and 92, respectively. A pair of oppositely disposed downwardly depending brackets 98 and 100 are secured to the cross members 90 and 94 and a wheel 102, which is similar to the wheels 38 and 40, and which may be considered as a rear wheel, is suitable journalled therebetween. The wheel 102 is preferably a fixed wheel in the same manner as the wheels 38 and 40 as hereinbefore set forth. A second pair of oppositely disposed downwardly depending brackets 104 and 106 are secured to the cross members 92 and 16, respectively, and a wheel 108 similar to the wheels 46 and 52 is suitable journalled therebetween. The wheel 108 is in substantial axial alignment with the wheel 102 but is preferably a fixed wheel in that it is not free for axial movement.

A first pair of longitudinally extending mutually parallel spaced channel members 110 and 112 are disposed inboard of the wheel 102, as shown in FIG. 2, and the right-hand ends thereof as viewed in the drawings are rigidly secured to the cross members 86 and 88 in any well-known manner. A second pair of longitudinally extending mutually parallel spaced channel members 114 and 116 are disposed inboard of the wheel 108 in spaced relation with respect to the channels 110 and 112, and the right-hand ends of the channels 114 and 116 are similarly rigidly secured to the cross members 86 and 88 in any suitable manner. The forward or left-hand ends of the channels 110, 112, 114 and 116 are rigidly secured to a common cross member 118 in any well known manner, thus providing a substantially rectangular framework inboard of the wheels 102 and 108.

A pair of downwardly depending brackets 120 and 122 are secured to the channels 110 and 112 in the proximity of the cross member 118, and a wheel 124 similar to the wheels 102 and 108 is suitably journalled therebetween. A second pair of downwardly depending brackets 126 and 128 are secured to the channels 114 and 116, and a wheel 130 is suitably journalled therebetween. The wheel 130 is preferably a floating wheel, as hereinbefore set forth, and is in substantial axial alignment with the wheel 124, which is preferably a fixed wheel.

The wheels 102 and 108 are preferably of the same type as the wheels 38, 40, 46, and 52. The wheel 102 is preferably disposed in "tracking" relation with the wheels 38 and 40 and rides along the rail 54 as hereinbefore set forth. The wheel 108 is preferably disposed in "tracking" relation to the wheels 46 and 52 and rides along the rail 56 in the same manner thereas. The wheels 124 and 130 are also preferably of the type having a grooved outer periphery for engaging and rolling along rails 112 and 134. The rails 132 and 134 are disposed inboard of the rails 54 and 56, respectively, and preferably extending in spaced parallel relation thereto for a purpose as will be hereinafter set forth.

A plurality of transversely extending spaced strap members 136 are secured to the upper portions of the channels 110, 112, 114, and 116 as particularly shown in FIG. 2 and span the distance therebetween for supporting a substantially centrally disposed pedestal 138. A pipe engaging means 140 generally similar to the pipe engaging means 70, but oppositely disposed with respect thereto, is suitably secured to the upper end of the pedestal 138 and is so arranged as to be in substantial axial alignment with the pipe engaging means 70 at an adjacent vehicle, such as the vehicle 10. The pipe engaging means 140 comprises a suitable rotatable axle 142 journalled in a pillow block bearing 144, or the like, which is secured to a support block 145. The block 145 is slidably secured to the pedestal 138. A clutch element 146 is carried at one end of the axle 142 for simultaneous rotation therewith. A pipe engaging plug means 76 is carried at the opposite end of the axle 142 in the same manner and for the same purpose as hereinbefore set forth.

The clutch elements 78 and 146 are preferably complementary elements adapted for selective engagement for transmitting rotation therebetween. As particularly shown in FIGS. 5, 6, and 7, the clutch element 78 may comprise a main body 148 having a centrally disposed outwardly extending boss 150 on the outer face thereof extending in a direction toward the clutch element 146. A reduced diameter centrally disposed hub 152 extends outwardly from the boss 150. A pair of rotatable pawl elements 154 and 156 are suitably journalled on the exposed face of the boss 150 and are diametrically disposed on oppposite sides of the hub 152. Each pawl element is provided with a pair of angularly disposed outwardly extending fingers or pawls 156 and 158 as particularly shown in FIG. 5. One pawl, such as the pawl 158, engages the outer periphery of the hub 152, and the outer end of the other pawl 156 is free for a purpose as will be hereinafter set forth.

The clutch element 146 comprises a main body portion 160 having a central recess 162 provided in the outer face thereof for selectively receiving the hub member 152 therein. In addition, a pair of diametrically opposed lugs 164 are provided on the outer face of the body 160 for engagement by the free pawls 156 in the engaged position between the clutch elements 78 and 146. Each lug 164 is preferably provided with one tapered end 166 and one square end 168.

When the clutch elements 78 and 146 are moved into a clutching engagement as shown in FIG. 7, the elements are both normally rotated about the axes thereof, as will be hereinafter set forth. As the elements 78 and 146 move into engagement, the hub member 152 engages the recess 162, and the pawls 156 rotate with the body 148 until the free ends thereof engage the square ends 168 of the lugs 164. Upon engagement of the pawls 156 with the lugs 164, the clutch elements 78 and 146 are locked together for simultaneous rotation therebetween. In the event the element 146 is rotating in a direction opposite from the direction of rotation of the element 78, the free ends of the pawls 156 will ride over the tapered ends 166 and will not engage the lugs 164 in a driving relationship. Of course, it is preferable that the pawls 158 be connected with the outer face of the boss 150 by suitable spring members 170 for constantly urging the pawl elements 154 and 156 in a clockwise rotational direction, as viewed in FIG. 5 whereby the free ends of the pawls 156 are constantly urged in an outward direction for efficiently engaging the lugs 164 of the clutch elements 146 in the engaged position of the clutch members.

In use, a vehicle 10 is disposed in the proximity of one end of a pipe section 12, such as the rear or following end thereof, and a vehicle 14 is disposed in the proximity of the opposite end of the pipe. The support blocks 75 and 145 may be slidably moved with respect to the pedestals 68 and 138 in order that sufficient clearance is provided between the end of the pipe sections 12 and the pipe engaging plug members 76 whereby a plug member 76 may be inserted into the opposite ends of the pipe section. The support blocks 76 may then be slidably moved on the respective pedestals 68 and 138 for moving the shoes 82 into a wedging engagement with the inner periphery of the pipe, thus securely engaging the opposite ends of the pipe section whereby the pipe 12 will be supported by and suspended between the two vehicles 10 and 14. The vehicles and pipe carried thereby are then free for movement along the rails 54, 56, 132, and 134, as particularly set forth in my co-pending application. The floating wheels compensate for any variating of space between the trucks or rails.

As a pipe section is moved longitudinally in any well-known manner, such as by the push roller means (not shown) set forth in my co-pending application, and simultaneously rotated about its own longitudinal axis in any suitable manner, such as by said push rollers, the cars or vehicles 10 and 14 roll freely along the rails, and the axles 72 and 142 are rotated simultaneously with the pipe section. When a pair of adjacent tandem or lineally arranged pipe sections are moved in a position of substantial end-to-end abutment, the clutch leading vehicle 14 of the second pipe section tests or telescopes with respect to the rear or following vehicles 10 of the first pipe section 12 as shown in FIGS. 1 and 2. In this relative position between the vehicles 10 and 14, the clutch element 78 of the car 10 is brought into engagement with the clutch element 146 of the car 14. When the clutch elements 78 and 146 are rotating in a common direction, the pawls 156 of the clutch element 78 will engage the ratchets or lugs 164 of the clutch element 146, and particularly the shoulders 168 thereof, for transmitting rotation between the engaged clutch elements. Thus any rotation of one pipe section 12 is transmitted to the second pipe section. In addition, any longitudinal movement of one pipe section is also transmitted to the other pipe section by virtue of the engagement of the clutch element of the cars 10 and 14.

In a pipe coating system as described and disclosed in my co-pending application, canted push rollers (not shown) are provided for engagement with the outer periphery of the pipe sections for transmitting both longitudinal and rotational movement to the pipe section engaged thereby. When a plurality of linear pipe sections are passing through the pipe coating system and through the push roller section thereof, the pipe sections which have previously moved through the push roller section are longitudinally and rotationally moved by the pipe sections disposed within the push roller section at any one time. The push rollers are preferably arranged so as to engage a single pipe section through a sufficiently great longitudinal distance as to engage the next succeeding pipe section prior to a complete disengagement from the first pipe section. In this manner, at least one pipe section in the string of succeeding pipe sections will always be driven in both a rotational and longitudinal direction by the push roller means. In addition, as a following pipe section approaches the immediately preceding pipe section, the rotational speed of the following pipe section will be brought up to substantially the same rotational speed of the preceeding pipe section prior to the engagement between the respective clutch elements 78 and 146. It will be readily apparent that all of the pipe sections in the system which have at least reached the push roller section will be maintained in a longitudinally and rotationally moving procession.

When the pipe sections no longer require transporting by the vehicles 10 and 14, the blocks 75 and 145 may once again be moved slidably with respect to the pedestals 68 and 138 for permitting a disengagement of the pipe engaging plug means 76 from the ends of the pipe section 12. The pipe sections may be removed from the vehicles in any well-known manner (not shown), and the vehicles may be moved in a reverse direction in any suitable manner (not shown) in order that they may be reused as required or desired.

It is preferable that the vehicles 10 and 14 not be powered. However, if desired, any suitable power source, such as a gasoline engine, or the like, may be provided for the vehicles. In addition, it may be desirable to provide one or both vehicles 10 and 14 with a suitable winch and line mechanism (not shown) for facilitating movement of the vehicles independently of the pipe sections.

From the foregoing, it will be apparent that the present invention provides complementary wheeled vehicles for supporting and moving linearly arranged objects in a manner whereby the vehicles may be intersonnected in a nesting relationship for facilitating a continuity of movement between the successive objects. The novel vehicles are simple and efficient in operation and economical and durable in construction.

Whereas the present invention has been described in particular relation to the drawings attached hereto, it should be understood that other and further modifications, apart from those shown or suggested herein may be made within the spirit and scope of this invention.

What is claimed is:

1. Complementary wheeled vehicles for transporting linerally arranged objects, said vehicles comprising main frame means, wheel means journalled on said frame means for moving said vehicles, pedestal means provided for each vehicle, object engaging and supporting means carried by each pedestal and disposed thereon for selective mutual operable engagement between said object engaging and supporting means of one vehicle and the adjacent object engaging and supporting means of the other vehicle, an inboard frame portion provided on the frame means of one of said vehicles and having support wheels journalled thereon for nesting within the frame means and between the wheel means thereon of the other of said vehicles in one relative position therebetween for facilitating the engagement between the said object engaging and supporting means of each pedestal means.

2. Complementary wheeled vehicles as set forth in claim 1 wherein the object engaging and supporting means is slidably secured to the respective pedestal means for facilitating engagement with said object and disengagement therefrom.

3. Complementary wheeled vehicles as set forth in claim 1 wherein the object engaging and supporting means of each vehicle are provided with complementary clutch elements adapted for driving engagement upon engagement between said object engaging and supporting means.

4. Complementary wheeled vehicles as set forth in claim 3 wherein the complementary clutch elements transmit movement between succeeding objects for a continuity of movement therebetween.

5. Complementary wheeled vehicles as set forth in claim 1 wherein the wheels are provided with a grooved outer periphery for rolling freely along complementary rail members.

6. Complementary wheeled vehicles as set forth in claim 1 wherein the object is a tubular member.

7. Complementary wheeled vehicles as set forth in claim 6 wherein the object engaging and supporting means includes pipe engaging plug means adapted for insertion within the open end of the tubular member.

8. Complementary wheeled vehicles as set forth in claim 7 and including protector means encasing the upper portion of the exposed portions of the object engaging and supporting means and the ends of the tublar member for protection thereof.

9. Complementary wheeled vehicles for transporting linerally arranged objects, said vehicles comprising main frame means, wheel means journalled on said frame means for moving said vehicles, pedestal means provided for each vehicle, object engaging and supporting means carried by each pedestal and disposed thereon for selective mutual engagement between said object engaging and support means, an inboard frame portion provided on the frame means of one of said vehicles for nesting within the frame means of the other of said vehicles in one relative position therebetween for facilitating the engagement between the said object engaging and supporting means of each pedestal means, and wherein the wheel means of one of said vehicles comprises a first pair of substantially axially aligned wheels provided in the proximity of one end of said frame means, and a second pair of substantially axially aligned wheels provided in the proximity of the opposite end of said frame means in substantially tracking relation with the first pair of wheels; and the wheel means of the other of said vehicles comprises a first pair of substantially axially aligned wheels provided in the proximity of the end of the inboard frame portion disposed inboard with respect to the other vehicle wheels, and a second pair of substantially axially aligned wheels provided in the proximity of the opposite end of the frame means and disposed in substantial tracking relation with the wheels of the other vehicle.

10. Complementary wheeled vehicles for transporting linerally arranged objects, said vehicles comprising main frame means, wheel means journalled on said frame means for moving said vehicles, pedestal means provided for each vehicle, object engaging and supporting means carried by each pedestal and disposed thereon for selective mutual engagement between said object engaging and supporting means, an inboard frame portion provided on the frame means of one of said vehicles for nesting within the frame means of the other of said vehicles in one relative position therebetween for facilitating the engagement between the said object engaging and supporting means of each pedestal means, wherein the object is a tubular member, the object engaging and supporting means includes pipe engaging plug means adapted for insertion within the open end of the tubular member, and the pipe engaging plug means comprises an insert means adapted for insertion within the end of the tubular member, shoe means provided on said insert means for wedging engagement with the inner periphery of the tubular member for securely supporting the tubular member on the wheeled vehicles.

11. Complementary wheeled vehicles as set forth in claim 13 wherein the shoe means comprises stair-stepped edge means for engagement with a plurality of diametric size tubular members.

* * * * *